United States Patent
Renard et al.

(10) Patent No.: US 7,871,092 B2
(45) Date of Patent: Jan. 18, 2011

(54) STRUCTURAL MOTOR VEHICLE AXLE SYSTEM ASSEMBLED BY STRUCTURAL BONDING

(75) Inventors: Jacques Renard, Champlan (FR); Alexis De Pompignan, Le Mans (FR); Bernard Criqui, Suresnes (FR); Julien Berson, Le Mans (FR); Samuel Fays, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 317 days.

(21) Appl. No.: 11/577,454

(22) PCT Filed: Oct. 7, 2005

(86) PCT No.: PCT/FR2005/050831

§ 371 (c)(1),
(2), (4) Date: Jun. 4, 2008

(87) PCT Pub. No.: WO2006/042988

PCT Pub. Date: Apr. 27, 2006

(65) Prior Publication Data

US 2008/0272569 A1    Nov. 6, 2008

(30) Foreign Application Priority Data

Oct. 18, 2004    (FR) .................................. 04 11001

(51) Int. Cl.
*B60G 11/20* (2006.01)

(52) U.S. Cl. ........................ 280/124.166; 280/124.107; 301/124.1

(58) Field of Classification Search .......... 280/124.107, 280/124.166, 124.167; 301/124.1
See application file for complete search history.

(56) References Cited

U.S. PATENT DOCUMENTS

| 5,800,024 A | 9/1998 | Steimmel et al. |
| 6,099,084 A | 8/2000 | Bungarten et al. |
| 2003/0071432 A1* | 4/2003 | Etzold .................. 280/124.166 |

FOREIGN PATENT DOCUMENTS

| DE | 19542523 | 5/1997 |
| EP | 1036680 | 9/2000 |

OTHER PUBLICATIONS

U.S. Appl. No. 11/995,616, filed Jan. 14, 2008, De Pompignan.

* cited by examiner

*Primary Examiner*—Eric Culbreth
(74) *Attorney, Agent, or Firm*—Oblon, Spivak, McClelland, Maier & Neustadt, L.L.P.

(57) ABSTRACT

A motor vehicle axle system including two longitudinal arms made of molded material and a torsionally flexible cross bracing made of high strength material different from the material of the arms, each arm including a lug for assembling by structural bonding the cross bracing to the arms. Each lug has an assembling edge configured to be assembled to one end of the cross bracing by generating self-binding with a surface of the cross bracing, an adhesive layer being applied between the assembling edge and the surface of the cross bracing, and the assembling edge of each lug has a variable thickness along its periphery and in the direction of the lug axis, the thickness being selected so as to minimize stresses exerted on the adhesive in the assembling zone. A method assembles the motor vehicle axle system.

16 Claims, 3 Drawing Sheets

STRUCTURAL MOTOR VEHICLE AXLE SYSTEM ASSEMBLED BY STRUCTURAL BONDING

BACKGROUND

The invention relates to a structural motor vehicle axle system assembled by structural bonding and the method of assembly thereof. The invention relates more particularly to torsionally flexible axle systems.

Currently, torsionally flexible axle systems are made of steel assembled by arc welding. This structure is economical and confers good performance to the axle system but has the drawback of being of greater weight and of causing alterations to the mechanical properties of the materials in the assembly zone due to the welding.

Lightweight axle systems are known, comprising longitudinal arms made of aluminum, articulated by means of pivots in order to avoid producing stresses in the assembly zones. This structure has the drawback of complicating the kinematics of the parts and of increasing the cost of the assembly.

The document EP-1 036 680 discloses a lightweight axle system formed by arms molded in aluminum and a cross bracing made of steel. The cross bracing is fitted into the arms, and a space made between the cross bracing and the arms is filled with adhesive. The joint is then compressed to complete the assembly. This compression step creates stresses in the assembled materials and in the adhesive which may lead to an embrittlement of the assembly. Moreover, this joint requires tight manufacturing tolerances in addition to the use of anaerobic adhesives which do not have optimal behavior, in particular in order to avoid scraping off the adhesive during the assembly of the two parts.

A further document U.S. Pat. No. 6,099,084 discloses a lightweight axle system formed by a cross bracing made of aluminum assembled by a force fit and possibly binding, in the suspension arms. In this case, the fit also creates significant stresses which may result in an embrittlement of the assembly zones and requires tight manufacturing tolerances and the use of anaerobic adhesives for the same reasons as the previous document. Moreover, the tightening torque which is obtained is limited.

BRIEF SUMMARY

The invention aims to alleviate these drawbacks by proposing a structural motor vehicle axle system formed from two different materials and assembled in a simple, reliable and inexpensive manner.

To this end, the subject of the invention relates to a structural motor vehicle axle system comprising two longitudinal arms made of molded material and a torsionally flexible cross bracing made of high strength material different from the material of the arms, each arm comprising a lug of substantially tubular closed profile, and with an axis substantially perpendicular to the axis of the arms, for assembling by structural bonding the cross bracing to the arms, characterized in that each lug has an assembling edge adapted to be assembled to one end of the cross bracing by generating self-binding with a surface of the cross bracing, an adhesive layer being applied between the assembling edge and the surface of the cross bracing, and in that the assembling edge of each lug has a variable thickness along its periphery and in the direction of the lug axis, this thickness being selected so as to minimize the stresses exerted on the adhesive in the assembling zone.

As the arms are made by molding, the thickness of their engaging portions is able to be controlled with high accuracy, so that the stresses exerted on the adhesive are also able to be controlled. A very low risk of tearing of the adhesive results. Associated with the self-binding of the assembled parts, this bonding makes it possible to obtain an assembly having a lifespan which is substantially equal to the lifespan of the motor vehicle. The self-binding has the advantage of causing the internal stresses in the assembled zones to be markedly lower than during pressing or forced mounting, such that the mechanical properties of the materials in the assembly zone deteriorate very little or not at all. It also has the advantage of avoiding the scraping-off of the adhesive during implementation and is, therefore, more advantageous for the use of structural adhesives and conventional methods of implementation in the motor industry.

Advantageously, the assembling edge of each lug has a variable width along its periphery. This width is selected so as to reduce to a minimum the stresses exerted on the adhesive. For example, in the highly stressed zones, this width is preferably increased so as to reduce the local stresses exerted on the adhesive and to improve the strength of the assembly. This width is also selected so as to be sufficient for allowing a correct transfer of force between the assembled parts.

In a particular embodiment, the assembling edge of each lug is formed by a tubular wall.

In a further embodiment, the assembling edge of each lug is formed by an internal tubular wall and an external tubular wall separated by a groove designed to be capable of receiving the end of the cross bracing. Such a configuration of the assembling edge makes it possible to improve the robustness of the assembly.

Preferably, the tubular wall of the assembling edge or the internal wall of the groove of the assembling edge is capable of generating self-binding with the internal surface of the end of the cross bracing. In the second configuration, the external wall of the groove thus forces the end of the cross bracing to remain in its position in contact against the internal wall, such that the mechanical stresses within the adhesive are limited, in addition to the risks of tearing thereof.

Still preferably, when the assembling edge is formed by two walls, a second adhesive layer is applied between the external surface of the end of the cross bracing and the external wall of the groove so as to reinforce further the robustness of the assembly.

Advantageously, a ring of internal dimensions substantially corresponding to the external dimensions of the cross bracing, or of the lug, is crimped around the ends of the cross bracing or of the lug, in the region of the assembling edge of each lug, so as to increase further the robustness of the assembly.

In a first embodiment, each end of the cross bracing has an open section oriented toward the ground. Such a configuration makes it possible to obtain a low torsional stiffness of the axle system.

In a further embodiment, the ends of the cross bracing have a closed section of increasing section and the assembling edges of the lugs have a decreasing section of substantially corresponding shape. This configuration increases the torsional stiffness of the axle system.

Advantageously, the central part of the cross bracing has an open section conferring a significant flexural strength suitable for maintaining the layout of the axle system and a torsional flexibility providing comfort.

Advantageously, the cross bracing and the arms are made of materials which are not metallurgically weldable. Preferably, the cross bracing is made of high strength steel and the arms are made of molded aluminum. High performance materials relative to their specific functionality are, therefore, used. Steel is the strongest material to confer a resilient function to the cross bracing whilst tolerating continuous, torsional, bending and tensile stresses, whilst the molded aluminum of the arms makes it possible to produce very elaborate shapes integrating all the functions for the wheel support, for the spring suspension, for pivoting and for the fixing of the longitudinal arms. A high performance and lightweight axle system is thus obtained.

The invention also relates to a method for assembling this structural motor vehicle axle system.

More particularly, when the central part of the cross bracing has an open section and the assembling edge of each lug is formed by a tubular wall, said method comprises the following steps:
- a—the ends of the cross bracing are covered with an adhesive layer,
- b—the open ends are then slightly separated,
- c—they are engaged around the assembling edges,
- d—the adhesive layer is then cured at ambient temperature or by heating.

On the other hand, when the ends of the cross bracing have a closed section of increasing section and the assembling edge of each lug is formed by a tubular wall, said method comprises the following steps:
- a—the ends of the cross bracing are covered with an adhesive layer,
- b—they are engaged around the assembling edges,
- c—the adhesive layer is then cured at ambient temperature or by heating.

Advantageously, when the ends of the cross bracing have a closed section of increasing section and the assembling edge of each lug is formed by an internal tubular wall and an external tubular wall separated by a groove capable of receiving the end of the cross bracing, said method comprises the following steps:
- a—a first adhesive layer is applied to the internal wall of the assembling edge (or to the internal face of the end of the cross bracing),
- b—a second adhesive layer is applied to the external face of the end of the cross bracing (or to the external wall of the assembling edge),
- c—the open ends are then slightly separated,
- d—they are fitted into the groove, then released,
- e—the adhesive layer is then cured at ambient temperature or by heating.

Finally, when the central part of the cross bracing has an open section and the assembling edge of each lug is formed by an internal tubular wall and an external tubular wall separated by a groove capable of receiving the end of the cross bracing, said method comprises the following steps:
- a—a first adhesive layer is applied to the internal wall of the assembling edge (or to the internal face of the end of the cross bracing),
- b—a second adhesive layer is applied to the external face of the end of the cross bracing (or to the external wall of the assembling edge),
- c—the ends are engaged around the assembling edges,
- d—the adhesive layer is then cured at ambient temperature or by heating.

BRIEF DESCRIPTION OF THE DRAWINGS

The invention is now described with reference to the accompanying non-limiting drawings, in which.

DETAILED DESCRIPTION

Figure 1:
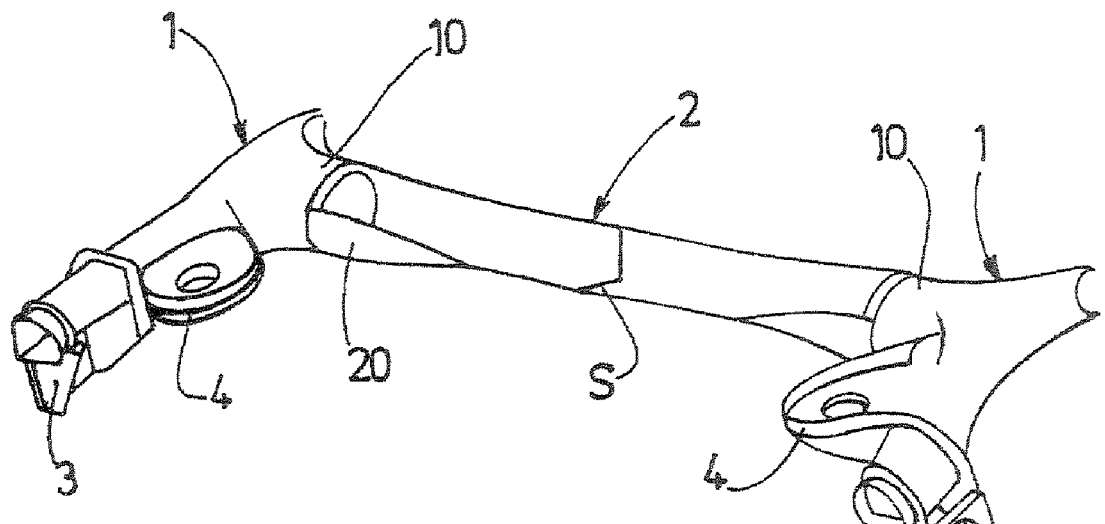
FIG. 1 is a perspective view from below of a structural motor vehicle axle system according to a first embodiment of the invention.

FIG. 1 shows a structural motor vehicle axle system comprising two longitudinal arms 1 connected by a torsionally flexible cross bracing 2.

The arms are made of molded aluminum and each have various functions, such as a wheel support 3, a suspension support 4 and an articulation to the vehicle (not shown).

The cross bracing is, itself, made of resilient high strength steel. It is, for example, made by pressing a metal sheet on a press with a plurality of passes so as to obtain the desired section and thickness. It has an open section over its entire length, the shape and the dimensions of this open section varying between the ends of the cross bracing so as to confer the desired properties of stiffness and flexibility thereto. Preferably, this section has, over its greater length, a significant inertia to flexion whilst retaining torsional flexibility. The line S on FIG. 1 represents an example of the section of the cross bracing in the vicinity of the center thereof.

Each arm 1 comprises a lug 10 of closed profile and with an axis substantially perpendicular to the axis of the arms, for the assembly of the arm with one end 20 of the cross bracing. To this end, the external surface of the lug 10 has an assembling edge 11 intended to come into contact with the internal surface of the end of the cross bracing.

Figure 2:
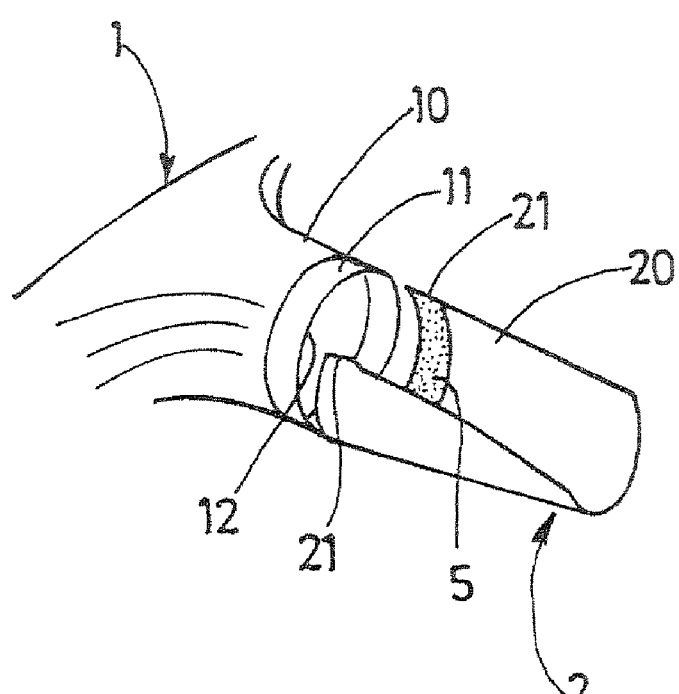
FIG. 2 is an enlarged view of the assembly zone of an arm and of the cross bracing of the axle system of FIG. 1, before assembly.

In a first embodiment shown in FIGS. 1 and 2, the assembling edge 11 of the lug 10 has a closed, tubular shape which is cylindrical in the example. Each end 20 of the cross bracing has an open section of which the opening is oriented toward the ground and which is to be applied against the assembling edge 11 of a lug 10. The section of the end is selected so as to cover the assembling edge over approximately half, preferably approximately two thirds, of the periphery of the lug 10. The degree of opening of the open section is defined according to the specifications of torsional stiffness of the cross bracing, whilst remaining sufficient to allow correct tightening of the end of the cross bracing on the lug. The dimensions of this open section are defined according to the flexural strength of the cross bracing.

The dimensions of the assembling edges 11 of the lugs 10 of the arms and the ends 20 of the cross bracing are selected so as to generate self-binding between the surfaces in contact with the assembled parts, in the example the internal face of the ends 20 of the cross bracing and the external surface of the assembling edges 11.

Figure 6:
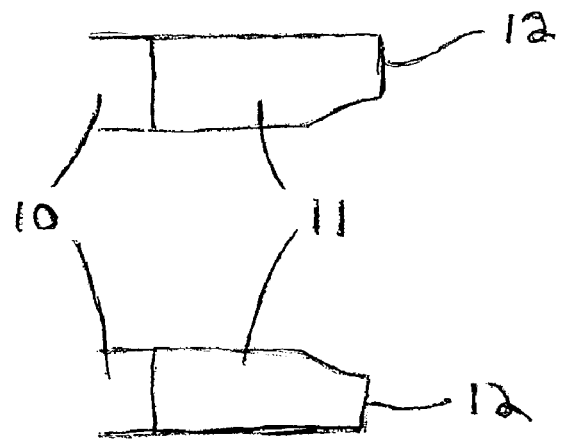
FIG. 6 schematically shows an axial section of the assembling edge with the thickness being reduced in a high stress zone.
Figure 7:
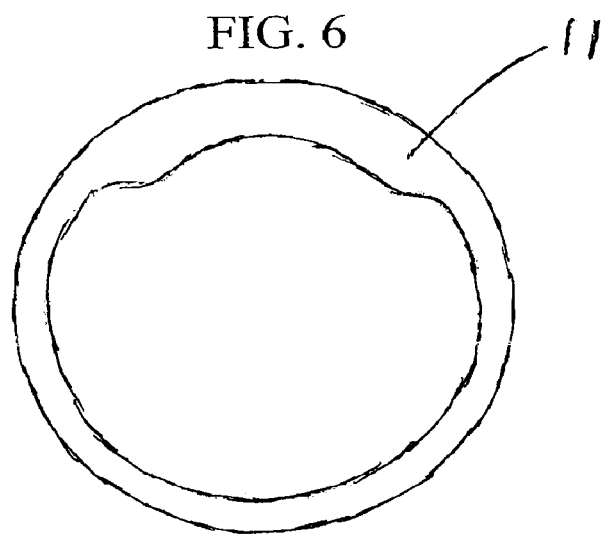
FIG. 7 schematically shows a peripheral section of the assembling edge with the thickness being reduced in a high stress zone.

The edge of the end 20 intended to be applied against the assembling edge 11 of each lug 10 is coated with an adhesive layer 5 over substantially the entire surface thereof (the adhesive may also be applied to the corresponding part of the assembling edge). After assembling the cross bracing and the arm, this adhesive layer 5 is subjected to higher stresses in the region of the free edge 12 of the assembling edge, and in the region of the free edges 21 of the ends of the cross bracing which extend parallel to the greater length thereof. In order to distribute these stresses, the thickness of the assembling edge is adapted in these high stress zones, in the direction of the axis of the lug and following the periphery of the lug. This thickness is, for example, reduced. FIG. 6 shows an axial section of the assembling edge 11 with the thickness being reduced in the high stress zone of the free edge 12 in the direction of the axis of the lug. FIG. 7 shows a peripheral section of the assembling edge 11 with the thickness being reduced in the high stress zone where the free edge 21 shown in FIG. 2 would contact the assembling edge 11.

In the example, the thickness of the zones of the assembling edge 11, corresponding to the greatest stresses exerted on the adhesive, varies from approximately 1 to 9 mm minimum, and from approximately 3 to 15 mm maximum, the thickness profile being such that the concentrations of stresses are limited and that there is a tendency toward a uniform distribution thereof over the width of the bonding.

The width of the assembling edge 11 is also selected so as to improve the distribution of the stresses exerted on the adhesive layer after assembly. This width is, for example, in the order of approximately 40 mm.

Figure 8:
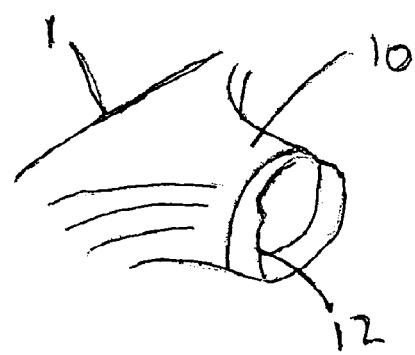
FIG. 8 is an enlarged schematically view of the assembly zone of an arm having a variable width and of the cross bracing of the axle system of FIG. 1, before assembly.

Advantageously, the assembling edge 11 of each lug 10 has a variable width along its periphery. This width is selected so as to reduce to a minimum the stresses exerted on the adhesive 5. For example, as shown in FIG. 8, this width is preferably increased in the highly stressed zones where the free edge 12 would contact the free edge 21 of the cross bracing 2 shown in FIG. 2 so as to reduce the local stresses exerted on the adhesive 5 and to improve the strength of the assembly. This width is also selected so as to be sufficient for allowing a correct transfer of force between the assembled parts.

The assembly of this axle system is carried out in the following manner. The internal surfaces of the ends 20 of the cross bracing are covered with an adhesive layer 5. These open ends 20 are then slightly separated so as to increase their section, and engaged around the assembling edges. Once in position, the ends of the cross bracing are released such that their section is tightened over the assembling edge 11, ensuring binding which promotes good cohesion of the bonding. The adhesive layer 5 is then cured at ambient temperature or by heating, depending on the nature thereof. For example, epoxy acrylic or polyurethane adhesives may be used as adhesive types.

Figure 3:
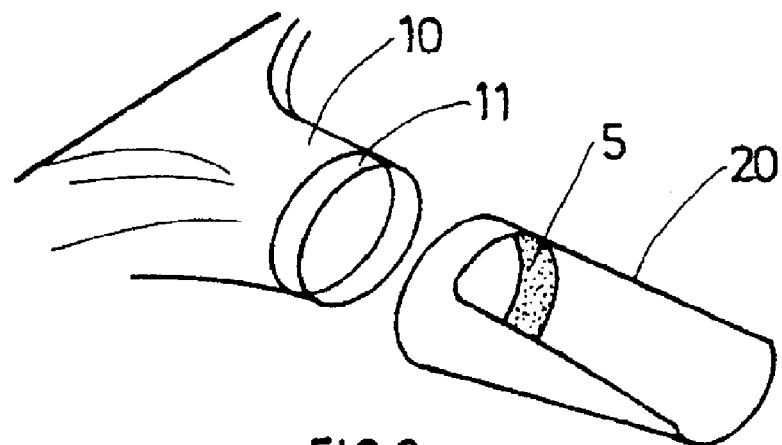
FIGS. 3 to 5 are enlarged views of the same assembly zone of further embodiments of an axle system according to the invention, before assembly.

FIG. 3 shows a variant of the preceding embodiment. In this embodiment, the ends 20 of the cross bracing have a closed section of flared shape. In the example, this section is conical. The assembling edges 11 thus also have a substantially corresponding conical shape so as to allow self-binding of the surfaces in contact. The adhesive layer 5 is applied to the assembling edge 11 on which the closed end 20 of the cross bracing is fitted until the binding of the parts is obtained.

Such a flared shape of the ends of the cross bracing espouses the ideal shape of the lug of the arm. The radius of connection is thus preferably selected so as to limit the formation of stresses between the assembly zone of the arm and of the cross bracing and the curved parts of the arm around the lug leading to the wheel support 3 and to the connection to the vehicle.

In the two embodiments disclosed above, the assembling edge of the lug of the arms is slightly recessed from the surface of the remainder of the arm, such that once assembled, the external surface of the cross bracing is flush with the external surface of the remainder of the arm. Such a configuration may, however, not be provided in other embodiments.

Figure 4:
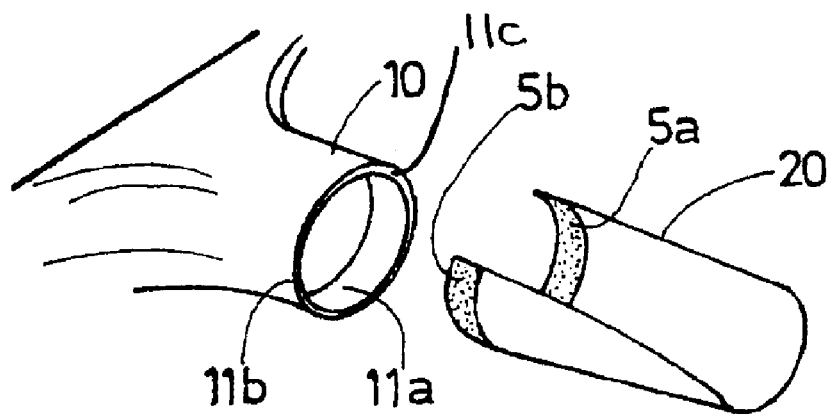

FIG. 4 shows a further embodiment of the assembling edges 11 of the lugs. These assembling edges 11 are formed from two internal 11a and external 11b tubular walls which oppose one another, separated by a groove 11c designed to receive the end 20 of the cross bracing. In the example shown, the walls 11a, 11b that form the groove 11c are cylindrical, and the end 20 of the cross bracing 2 has an open section similar to the embodiment of FIG. 1. The internal wall 11a of the assembling edge 11 is designed so as to generate self-binding with the internal surface of the end 20 of the cross bracing.

In this example, a first adhesive layer 5a is applied to the internal wall 11a of the assembling edge 11 (or to the internal face of the end of the cross bracing) and a second adhesive layer 5b is applied to the external face of the end of the cross bracing (or to the external wall 11b of the assembling edge 11 opposite the internal wall 11a.) The open end 20 of the cross bracing is thus slightly open and fitted into the groove 11c, then released to be tightened on the internal wall 11a of the assembling edge 11.

As a variant, the external wall 11b of the assembling edge 11 could also be designed so as to generate self-binding with the end of the cross bracing. Instead of being open, the end 20 would then be slightly closed when fitted.

Figure 5:
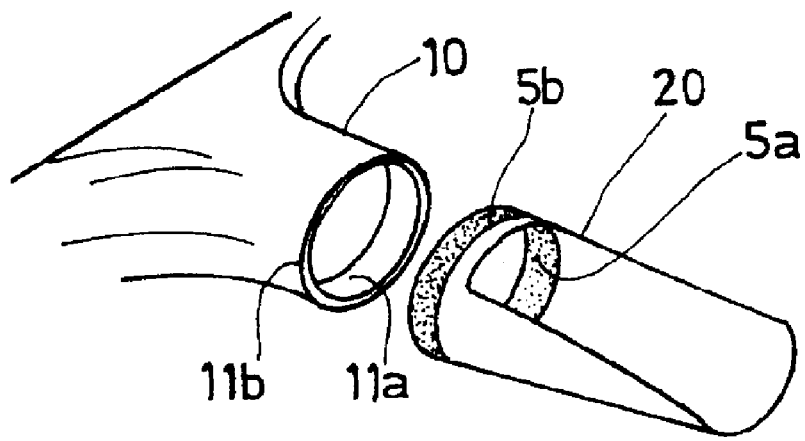

FIG. 5 shows a variant of this embodiment, in which the ends 20 of the cross bracing are closed and flared. In this example, these ends 20 are conical, as are the internal wall 11a and external wall 11b of each assembling edge. The assembly is thus carried out in a similar manner as for the example corresponding to FIG. 3, with two layers of adhesive on the outside and on the inside of the end of the cross bracing. The overlap width may be approximately 40 to 60 mm.

In these examples, the assembling edges of the lugs and the ends of the cross bracing have a circular section. Further shapes of cross sections may naturally be produced and the different variants disclosed with reference to the figures may be combined with one another. It is also possible to fit the ends of the cross bracing inside the lugs of the arms. The self-binding is thus generated between the external surface of these ends and the internal surface of the lug.

In order to reinforce the robustness of the assembly, a ring may be crimped around the lug or the cross bracing in the region of the assembling edges. Such a ring is, for example, also positioned so as to generate self-binding with the surface of the part which it surrounds.

The invention claimed is:

1. A structural motor vehicle axle system, comprising:
   two longitudinal arms made of molded material;
   a torsionally flexible cross bracing made of a material different from the material of the arms,
   wherein each arm comprises a lug of substantially tubular closed profile and with an axis substantially perpendicular to the axis of the arms, for assembling by structural bonding the cross bracing to the arms,
   wherein each lug includes an assembling edge configured to be assembled to one end of the cross bracing by generating self-binding with a surface of the cross bracing, an adhesive layer being applied between the assembling edge and the surface of the cross bracing, and the assembling edge of each lug having a variable thickness along its periphery and in a direction of the lug axis, the thickness selected to minimize stresses exerted on the adhesive layer in an assembly zone of each arm and the cross bracing.

2. The structural motor vehicle axle system as claimed in claim 1, wherein the assembling edge of each lug has a variable width along its periphery.

3. The structural motor vehicle axle system as claimed in claim 1, wherein the assembling edge of each lug is formed by a tubular wall.

4. The structural motor vehicle axle system as claimed in claim 1, wherein the assembling edge of each lug is formed by an internal tubular wall and an external tubular wall separated by a groove configured to receive the one end of the cross bracing.

5. The structural motor vehicle axle system as claimed in claim 3, wherein the tubular wall of the assembling edge is configured to generate self-binding with an internal surface of the one end of the cross bracing.

6. The structural motor vehicle axle system as claimed in claim 4, wherein a second adhesive layer is applied between an external surface of the one end of the cross bracing and the external wall of the assembly edge.

7. The structural motor vehicle axle system as claimed in claim 1, wherein each end of the cross bracing includes an open section oriented toward the ground.

8. The structural motor vehicle axle system as claimed in claim 1, wherein the ends of the cross bracing include a closed section of increasing section and the assembling edges of the lugs have a decreasing section of substantially corresponding shape.

9. The structural motor vehicle axle system as claimed in claim 1, wherein a central part of the cross bracing includes an open section.

10. The structural motor vehicle axle system as claimed in claim 1, wherein the cross bracing and the arms are made of materials that are not metallurgically weldable.

11. The structural motor vehicle axle system as claimed in claim 10, wherein the cross bracing is made of high strength steel and the arms are made of molded aluminum.

12. A method for assembling the structural motor vehicle axle system as claimed in claim 1, wherein a central part of the cross bracing includes an open section having open ends and the assembling edge of each lug is formed by a tubular wall, the method comprising:
   a) covering the ends of the cross bracing with an adhesive layer;
   b) separating the open ends;
   c) engaging the separated open ends around the assembling edges; and
   d) curing the adhesive layer at ambient temperature or by heating.

13. A method for assembling the structural motor vehicle axle system as claimed in claim 1, wherein the ends of the cross bracing include a closed section of increasing section and the assembling edge of each lug is formed by a tubular wall, the method comprising:
   a) covering the ends of the cross bracing with an adhesive layer;
   b) engaging the ends around the assembling edges; and
   c) curing the adhesive layer at ambient temperature or by heating.

14. A method for assembling the structural motor vehicle axle system as claimed in claim 1, wherein a central part of the cross bracing includes an open section having open ends and the assembling edge of each lug is formed by an internal tubular wall and an external tubular wall separated by a groove capable of receiving the end of the cross bracing, the method comprising:
   a) applying a first adhesive layer to the internal wall of the assembling edge or to the internal face of the end of the cross bracing;
   b) applying a second adhesive layer to the external face of the end of the cross bracing or to the external wall of the assembling edge;
   c) separating the open ends;
   d) fitting the separated open ends into the groove, and then releasing the fitted open ends; and
   e) curing the adhesive layer at ambient temperature or by heating.

15. A method for assembling the structural motor vehicle axle system as claimed in claim 1, wherein the ends of the cross bracing include a closed section of increasing section and the assembling edge of each lug is formed by an internal tubular wall and an external tubular wall separated by a groove capable of receiving the end of the cross bracing, the method comprising:
   a) applying a first adhesive layer to the internal wall of the assembling edge or to the internal face of the end of the cross bracing;
   b) applying a second adhesive layer to the external face of the end of the cross bracing or to the external wall of the assembling edge;
   c) engaging the ends around the assembling edges; and
   d) curing the adhesive layer at ambient temperature or by heating.

16. The structural motor vehicle axle system as claimed in claim 4, wherein the internal wall of the assembling edge that forms the groove is configured to generate self-binding with the internal surface of the one end of the cross bracing.

\* \* \* \* \*